(12) United States Patent  
Ahuja et al.

(10) Patent No.: US 8,694,016 B2  
(45) Date of Patent: Apr. 8, 2014

(54) METHODS AND APPARATUS FOR USE OF DATA OBJECT POPULARITY MEASUREMENTS FOR IMPROVED QUALITY OF SERVICE PERCEPTION IN WIRELESS BROADCAST SYSTEMS

(75) Inventors: Bharat Ahuja, Boulder, CO (US); Bruce Collins, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1514 days.

(21) Appl. No.: 11/566,633

(22) Filed: Dec. 4, 2006

(65) Prior Publication Data

US 2008/0039111 A1  Feb. 14, 2008

Related U.S. Application Data

(60) Provisional application No. 60/792,036, filed on Apr. 14, 2006.

(51) Int. Cl.
*H04W 72/00* (2009.01)
*H04W 4/00* (2009.01)

(52) U.S. Cl.
USPC ..... 455/452.2; 455/450; 455/451; 455/452.1; 455/509; 370/329; 370/346; 370/468

(58) Field of Classification Search
USPC ........ 725/62, 95–97; 709/218, 219, 223, 226, 709/231, 235; 455/3.01, 3.02, 69, 343.4, 455/414.1, 414.2, 414.3, 427, 450, 451, 455/452.1, 452.2, 453, 509, 510, 512, 517, 455/518, 522, 566, 574; 370/329, 346, 468
See application file for complete search history.

(56) References Cited

U.S. PATENT DOCUMENTS

| 5,886,984 | A   | * | 3/1999 | Abu-Amara et al. | 370/252 |
| 5,991,306 | A   |   | 11/1999 | Burns et al. | |
| 6,986,156 | B1  | * | 1/2006 | Rodriguez et al. | 725/95 |
| 6,999,432 | B2  | * | 2/2006 | Zhang et al. | 370/328 |
| 7,006,947 | B2  | * | 2/2006 | Tryon et al. | 702/183 |
| 7,296,071 | B2  | * | 11/2007 | Paila et al. | 709/226 |
| 7,411,924 | B2  | * | 8/2008 | Cho et al. | 370/328 |
| 7,424,273 | B2  | * | 9/2008 | Alexiou | 455/101 |
| 7,441,261 | B2  | * | 10/2008 | Slater et al. | 725/96 |
| 2003/0158923 | A1 | * | 8/2003 | Burkhart | 709/223 |
| 2004/0010588 | A1 |   | 1/2004 | Slater et al. | |
| 2004/0253980 | A1 |   | 12/2004 | Lane | |
| 2005/0120380 | A1 | * | 6/2005 | Wolfe | 725/100 |

FOREIGN PATENT DOCUMENTS

| EP | 1507364 A2 | 2/2005 |
| JP | 9312869 | 12/1997 |

(Continued)

OTHER PUBLICATIONS

International Search Report and Written Opinion—PCT/US2007/066631, International Search Authority—European Patent Office—Oct. 9, 2007 (050431).

*Primary Examiner* — Olumide T Ajibade Akonai
(74) *Attorney, Agent, or Firm* — The Marbury Law Group, PLLC

(57) ABSTRACT

Systems, methods, device and apparatus are provided that allocate broadcast delivery capacity based oil popularity measurements associated with broadcasted data objects. By allocating broadcast delivery capacity based on popularity measurements, Quality of Service (QoS) perception can be improved by decreasing the number of reception failures, decreasing the data object access delay and/or decreasing the consumption of wireless device resources, such as battery power and processing capabilities.

76 Claims, 7 Drawing Sheets

(56) References Cited

FOREIGN PATENT DOCUMENTS

| | | |
|---|---|---|
| JP | 2000010895 A | 1/2000 |
| JP | 2002123446 A | 4/2002 |
| JP | 2005151567 A | 6/2005 |
| KR | 2006010590 | 2/2006 |
| WO | WO0198971 A1 | 12/2001 |
| WO | WO2004073201 A1 | 8/2004 |
| WO | WO 2004112372 | 12/2004 |
| WO | 2006086059 A2 | 8/2006 |

* cited by examiner

METHODS AND APPARATUS FOR USE OF DATA OBJECT POPULARITY MEASUREMENTS FOR IMPROVED QUALITY OF SERVICE PERCEPTION IN WIRELESS BROADCAST SYSTEMS

CLAIM OF PRIORITY UNDER 35 U.S.C. §119

The present Application for Patent claims priority to Provisional Application No. 60/792,036 entitled "POPULARITY MEASURE FOR IMPROVED QOS PERCEPTION" filed Apr. 14, 2006, and assigned to the assignee hereof and hereby expressly incorporated by reference herein.

BACKGROUND

The disclosed aspects relate to wireless broadcast systems, and more particularly, to systems and methods for using data object popularity measurements to improve quality of service perception in wireless broadcast systems.

Large-scale deployment of mass media services/media objects over wireless communication networks may utilize broadcast/multicast network capabilities. Multimedia Broadcast and Multicast Service (MBMS) and Broadcast and Multicast Service (BCMCS), as proposed by telecommunications specifications-setting projects, such as the $3^{rd}$ Generation Partnership Project (3GPP) and $3^{rd}$ Generation Partnership Project 2 (3GPP2), as well as, MediaFLO™ technology as developed and available from Qualcomm Incorporated of San Diego, Calif., are targeted towards enabling multimedia content transfer to handheld communication devices over the wireless channel. The MediaFLO™ broadcast network provides services that allow transfer of media objects, such as digital movie clips, sports broadcasts, video clips and music files. These media objects are delivered by a content provider to the MediaFLO™ network, where they are stored until the scheduled transmission time.

An important characteristic of broadcast services is that the radio transmission cost is independent of the number of subscribers m the cell. This provides a resource-efficient way of delivering, services/media objects to large user groups and, hence, improves the scalability of the network. However, resource-efficient broadcast/multicast communication has some potential inefficiency. For example, diverse channel conditions between the sender and its many receivers make the problem of providing reliable transfer a challenging task. Forward Error Correction (FEC) techniques would require redundancy levels sufficient to overcome transmission losses for the receiver in the worst-ease radio channel. Hence, system resources, such as channel data rate, channel code rate, transmit power, arid the like, are essentially a function of the worst-case radio channel.

Therefore, a need exists to develop a method for "intelligently" allocating network resources, such as throughput capacity/bandwidth, in broadcast/multicast networks. Intelligent allocation of network resources would overcome current inefficiencies in allocating resources based on a worst-case user/radio channel.

SUMMARY

The disclosed apparatus and methods provide for the use of data object popularity measurements to determine the allocation of wireless broadcast system capacity.

In particular, devices, methods, apparatus, computer-readable media and processors are presented that provide for data object popularity measurements to be used in determining, the allocation of broadcast system capacity, such as throughput bandwidth. Popularity measurements may be used in conjunction with theoretical mathematical equations, such as optimization problems, to calculate capacity for data objects. Alternatively, the popularity measurements may be used in conjunction with heuristic simulations to determine capacity for data objects. Allocated capacity may be reflected in adjustment to the delivery rate of data objects, e.g., adjusting the code rate at which a data object is sent in a given period of time or allocated capacity may be reflected in adjustment to the amount of redundant information delivered in code blocks. By allocating capacity based on popularity measurements, a perceived Quality of Service (QoS) is realized in the form of minimization of reception failures, minimization of reception errors or defects, minimization of data object access delays and minimization of the use of wireless device resources, such as battery power and processing capabilities.

Optimal channel capacity assignment can result in a reduction of the number of reception failures in the broadcast system versus assigning channel capacity equally to all the data objects in the broadcast system. Such a capacity assignment approach provides for improvement of the perception of the Quality of Service (QoS). Improvement of the QoS is perceived through a decrease in reception failures, a decrease in access delay and a decrease in wireless device power consumption.

Data object popularity may be defined, in terms of the utility or importance measure of the object amongst the users. Non-uniformity in Internet-based, data object request patterns is a well-documented phenomenon. Numerous studies, such as described in "Analysis of Educational Media Server Workloads", Almeida et al., NOSSDAV 2001 and "Characterizing User Access to Videos on the World Wide Web", Acharya et al., ACM/SPIE Multimedia Computing and Networking, January 2000, have shown a skewed popularity of both data and web objects. Analysis of data/media server workloads shows a high locality of accesses: 14-30% of the files accessed on the server account for 90% of the data/media sessions. Thus, since a large fraction of users are interested in the most popular data objects, improving the delivery performance for those objects, improves the overall user experience.

In one aspect, a method is provided for formulating delivery of data content in wireless broadcast system is defined. The method includes receiving a popularity measurement associated with at least one data object. The method additionally includes allocating wireless broadcast system capacity for delivery of at least one data object based on the popularity measurement and formulating the delivery of at least one data object according to the allocated wireless broadcast system capacity. The method may be applied to real-time and non-real-time delivery of data content.

In some aspects the allocating of wireless broadcast system capacity may entail calculating capacity as a function of the popularity measurement, such solving an optimization problem related to a broadcast system allocation objective. Alternatively, allocating wireless broadcast system capacity may entail a heuristic simulation method. Once capacity has been allocated, the method may implement allocation by adjusting the delivery rate, e.g., increasing/decreasing delivery repetitions in a given time period or adjusting the amount of redundant information in coded blocks.

In another aspect, at least one processor is defined that is configured to perform the actions of receiving a popularity measurement associated with at least one data object, allocating wireless broadcast system capacity for delivery of at least one data object based on tire popularity measurement and formulating the delivery of at least one data object according to the allocated wireless broadcast system capacity.

A related aspect is defined by a machine-readable medium including instructions stored thereon. The instructions include a first set of instructions for receiving a popularity measurement associated with at least one data object, a second set of instructions for allocating wireless broadcast system capacity for delivery of at least one data object based on the popularity measurement and a third set of instructions for formulating the delivery of at least one data object according to the allocated wireless broadcast system capacity.

Another aspect is defined by a wireless network device for allocating broadcast delivery capacity. The network device includes a computer platform including a processor and a memory. The network device also includes a capacity allocation module stored in the memory and executable by the processor. The capacity allocation module includes capacity allocation logic operable for receiving a popularity measurement associated with at least one data object and determining allocation of wireless network broadcast capacity for delivery of at least one data object based on the popularity measurement. The network may optionally include a delivery mechanism operable for delivering at least one data object according to the allocated wireless broadcast system capacity.

Alternatively, the network device for allocating broadcast delivery capacity may be defined by a means for receiving a popularity measurement associated with at least one data object and a means for allocating wireless broadcast system capacity for delivery of at least one data object based on the popularity measurement.

Yet another aspect is defined in terms of a method for receiving data content at a wireless device. The method includes providing data object usage information to a network entity and receiving one or more broadcasted data objects that are allocated wireless broadcast system capacity based on a popularity measurement associated with the usage information. The received broadcasted data items may have a delivery rate associated with the popularity measurement or may have a redundant data quantity associated with the popularity measurement. The method may provide for a decrease in the mean number of failures, data object access delay and/or power consumption on the wireless device as a result, of receiving the one or more broadcasted data objects that are allocated, wireless broadcast system capacity based on a popularity measurement associated with the usage information.

In a related aspect, at least one processor is defined that is configured to perform the actions of providing-data object popularity information to a network entity and receiving one or more broadcasted data objects that are allocated, wireless broadcast system capacity based on a popularity measurement associated with the popularity information.

Another related aspect is defined by a machine-read-able medium including instructions stored thereon. The instructions include a first set of instructions for providing data object popularity information to a network entity and a second set of instructions for receiving one or more broadcasted data objects that are allocated wireless broadcast system capacity based on a popularity measurement associated with the popularity information.

In yet another aspect, a wireless communication device is defined that includes a computer platform including a processor and a memory. The wireless device also includes a data object usage reporting module stored in the memory and executable by the processor, wherein the data object usage reporting module is operable for providing data object usage information to a network entity and a communications module operable by the processor and operable for receiving one or more broadcasted data objects that are allocated wireless broadcast system capacity based on a popularity measurement associated with the popularity information.

Further, an aspect is defined for a wireless communication device that includes a means for providing data object popularity information to a network entity and a means for receiving one or more broadcasted data objects that are allocated wireless broadcast system capacity based on a popularity measurement associated with the popularity information.

As such, the present aspects provide for the allocation of broadcast delivery capacity based on popularity measurements associated with broadcasted data objects. By allocating broadcast delivery capacity based on popularity measurements Quality of Service (QoS) perception can be improved by decreasing the mean number of reception failures, decreasing the data object access delay and/or decreasing tire consumption of wireless device resources, such as battery power and processing capabilities.

DETAILED DESCRIPTION

The present devices, apparatus, methods, computer-readable media and processors now will be described more fully hereinafter with reference to the accompanying drawings, in which aspects of the invention, are shown. The devices, apparatus, methods, computer-readable media and processors, however, may be embodied in many different forms and should not be construed as limited to the aspects set forth herein; rather, these aspects are provided so that this disclosure will be thorough and complete, and will fully convey the scope of the invention to those skilled in the art. Like numbers refer to like elements throughout.

Figure 1:
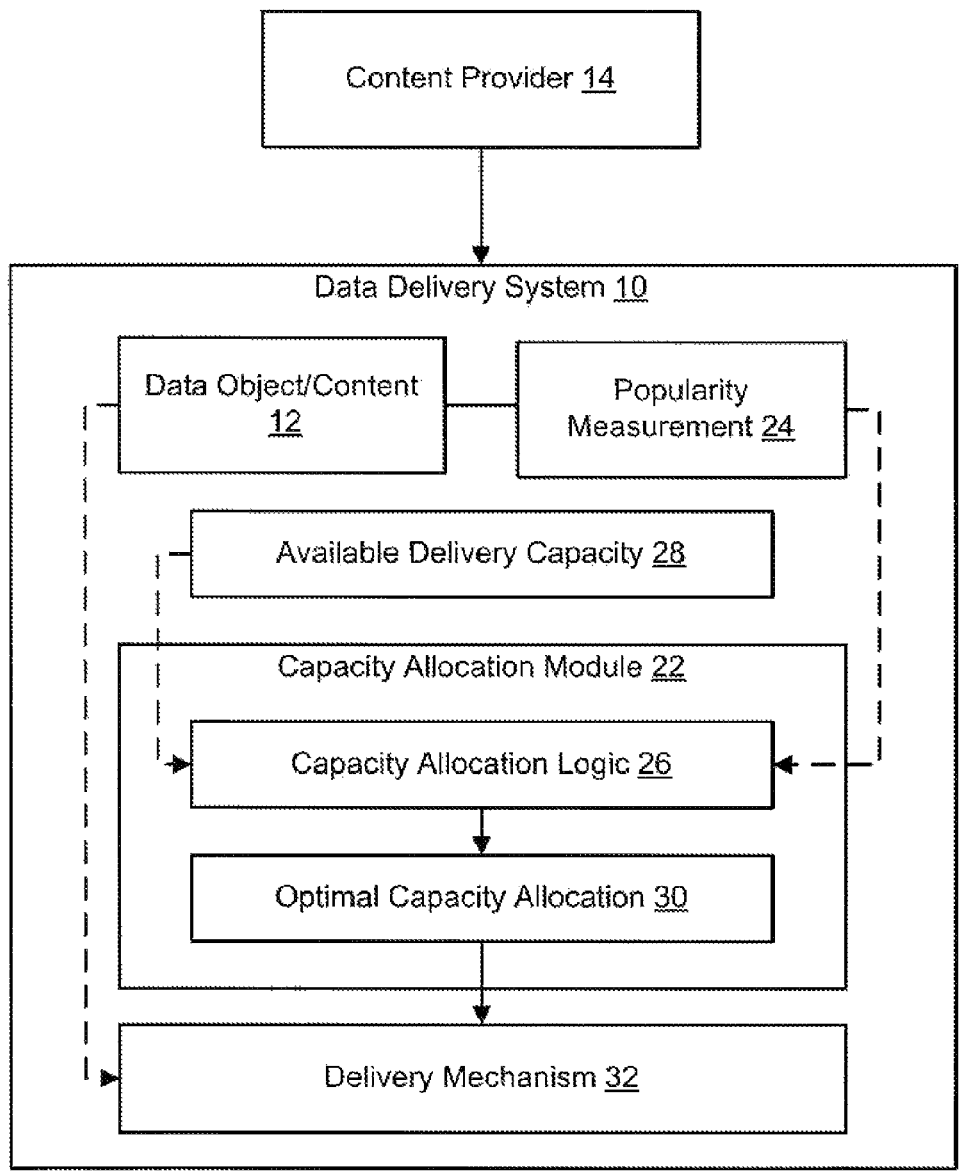
FIG. 1 is a block diagram of a system for allocating broadcast network capacity based on data object popularity measurements, in accordance with an aspect.
Figure 1:
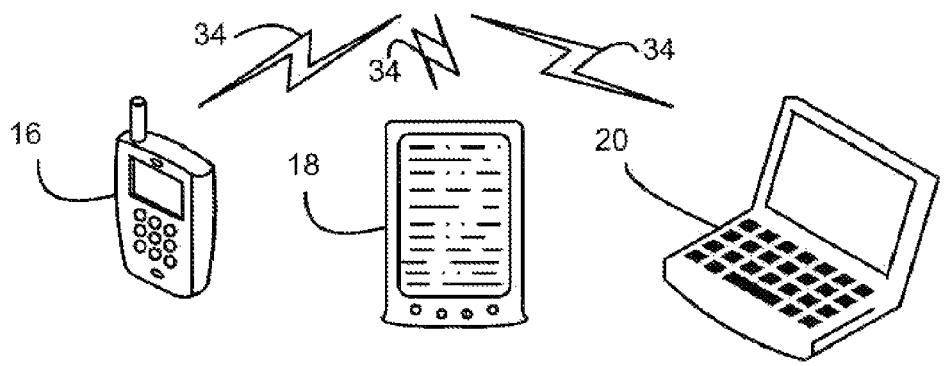

FIG. 1 is a block diagram of a system for allocating broadcast network capacity based on data object popularity measurements. The system includes a data delivery system 10 that receives data objects 12, such as media content, from one or more content providers 14 and wirelessly delivers the data objects to wireless devices, such as wireless telephone 16, personal digital assistant 18 and portable computing device 20. The data delivery system 10 may be located at an operation center site and may include the implementation of one or more network devices, such as servers, storage units and the like operable for receiving and delivering data objects, storing data objects and popularity measurements and providing computational processing for allocating broadcast network capacity based on the popularity measurements. The data objects 12 may include media objects, such as video files, audio files, multimedia files and the like, or any other form of data for the consumption of one or more users. The content provider 14 may deliver content to the data delivery system 10 by any known manner, such as electronically, personally or the like. Electronic delivery may be wireless or wired and, as such, may include use of satellites, a communication network such as the Internet or the like. The data objects 12 may be communicated to the wireless devices across wireless network 34 in either real-time transmission or non-real-time communication. For example, the MediaFLQ™ system available from Qualcomm Incorporated of San Diego, Calif. provides for a wireless multimedia delivery system that relies on forward link only technology.

The data delivery system 10 includes a capacity allocation module 22 that is operable to allocate broadcast network capacity based on data object popularity measurements 24. The data delivery system 10 may obtain popularity measurements, otherwise referred to as popularity metrics, utility measurements/metrics, importance measurements/metrics and the like, from, any available source. For example, popularity measurements may be obtained from subscription data, polling users on a predetermined or random basis, content providers or any other service or entity that has access to data object popularity data. The means by which popularity measurements are obtained, and the form in which popularity measurements are presented are inconsequential to the overall inventive concepts herein disclosed. Additionally, it should be noted that a popularity measurement may apply to a single data object or file, or the popularity measurement may apply to a group or set of more than one data object.

The capacity allocation module 22 may include capacity allocation logic 26 that is operable to determine allocation of broadcast network capacity based on popularity measurements 24. The capacity allocation logic 26 relies on the available delivery capacity 28 (e.g., available bandwidth) and the popularity measurements 24 to determine an optimal (e.g., popularity-specific) capacity allocation 30 for at least one data object or one or more sets of data objects, hi one aspect, the capacity allocation logic 24 may implement theoretical equations to calculate all optimal capacity allocation 30 for data objects based on popularity measurements 24. A detailed example of theoretical calculations of allocated object capacities based on popularity measurements is presented infra. In other aspects, the capacity allocation logic 24 may implement ad hoc heuristic simulations/optimizations to derive an optimal capacity allocation 30 value for each data object or each group of data objects.

The data delivery system 10 also includes a delivery mechanism 32 that is operable for distributing the data objects across wireless network 34 according to the optimal capacity allocation. As previously noted, the distribution mechanism 32 may reside in the same network device as the capacity allocation module 22 or, in alternate aspects; the delivery mechanism may reside in a separate network device.

Figure 2:
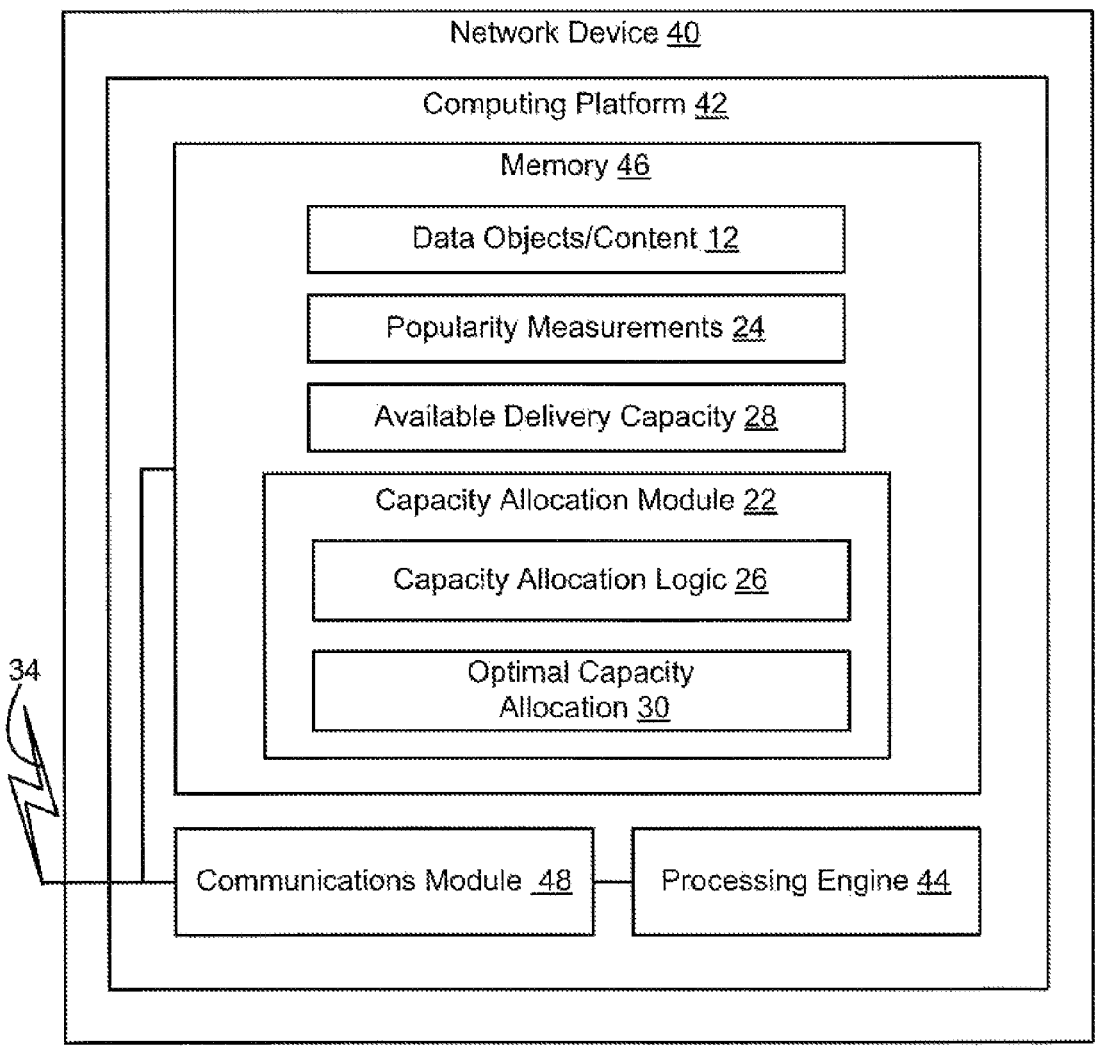
FIG. 2 is block diagram of a network device for allocating broadcast network capacity based on data object popularity measurements, in accordance with an aspect.

FIG. 2 is a block diagram illustration of a network device 40 for allocating broadcast network capacity based on data object popularity. As previously noted network device may comprise at least one of any type of network device, such as a server, personal computer, mini computer, mainframe computer, or any computing device either special purpose or general computing device having a computing platform 42, a processing engine 44, and a memory 46. Alternatively, the network device 40 may comprise more than one network device. Further, the modules, applications and logic described herein as being operated on or executed by the network device 16 may be executed entirely on a single network device or alternatively, in other aspects, separate servers or computer devices may work in concert to provide data in usable formats to parties, and/or to provide a separate layer of control in the data flow between the wireless device clients and the modules and applications executed by network device 40.

The network device 40 may include computer platform 42 operable to transmit and receive data across wireless network 34, and that can execute routines and applications. Computer platform 42 may include a memory 46, which may comprise volatile and nonvolatile memory such as read-only and/or random-access memory (RAM and ROM), EPROM, EEPROM, flash cards, or any memory common to computer platforms. Further, memory 46 may include one or more flash memory cells, or may be any secondary or tertiary storage device, such as magnetic media, optical media, tape, or soft or hard disk. Further, computer platform 42 also may include a processing engine 44, which may be an application-specific integrated circuit (ASIC), or other chipset, processor, logic circuit, or other data processing device.

The computer platform 42 may further include, a communications module 48 embodied in hardware, firmware, software, and combinations thereof, that enables communications among the various components of the network device 40, as well as between the network device 40 and a wireless network 34. In this regard, in some aspects, communications module 48 may serve as the delivery mechanism 33 (shown in FIG. 1) that is operable for distributing the data objects across wireless network 34 in accordance with the optimal capacity allocation. The communication module may include the requisite hardware, firmware, software and/or combinations thereof for establishing a wireless communication connection.

The memory 46 may include one or more data objects/content 12 that have been provided to the network device 40 by one or more content providers 14. The data objects 12 may be delivered to network device 40 by wireless or wired communication or any other feasible means of content delivery. As previously noted, in alternate aspects, data content 12 may be stored in a separate network device or server distinct from, but in communication with, network device 40. The memory 46 may also include popularity measurements 24 that have been provided to the network device 40, such as, by one or more content providers or subscription services. Alternatively, the popularity measurement may be calculated or aggregated at the network device 40 by polling various service providers, subscription services or data content users to determine the popularity or importance of a data object or group of data objects. It should be noted that any acceptable means may be used to determine the popularity measurement and, as such, popularity data may be included from any selected data object sources and/or data object users. The popularity measurements 24 may be delivered to network device 40 by wireless or wired communication or any other feasible means of delivery. As previously noted, in alternate aspects, popularity measurements 24 may be stored in a separate network device or server distinct from, but in network communication with, network device 40.

The memory 46 of network device 40 includes capacity allocation module 22 that is operable to allocate broadcast network capacity based on data object popularity measurements 24. The capacity allocation module 22 may include capacity allocation logic 26 that is operable to determine allocation of broadcast network capacity based on popularity measurements 24. The capacity allocation logic 26 relies on the available delivery capacity 28 (e.g., available bandwidth) and the popularity measurements 24 to determine an optimal (e.g., popularity-specific) capacity allocation 30 for at least one data object or one or more sets of data objects associated with a broadcast transmission. In one aspect, the capacity allocation logic 24 may implement theoretical equations to calculate an optimal capacity allocation 30 for data objects in a transmission based on popularity measurements 24. In other aspects, the capacity allocation logic 24 may implement ad hoc heuristic simulations/optimizations to derive an optimal capacity allocation 30 value for one or more data objects or one or more groups of data objects in a transmission.

Figure 3:
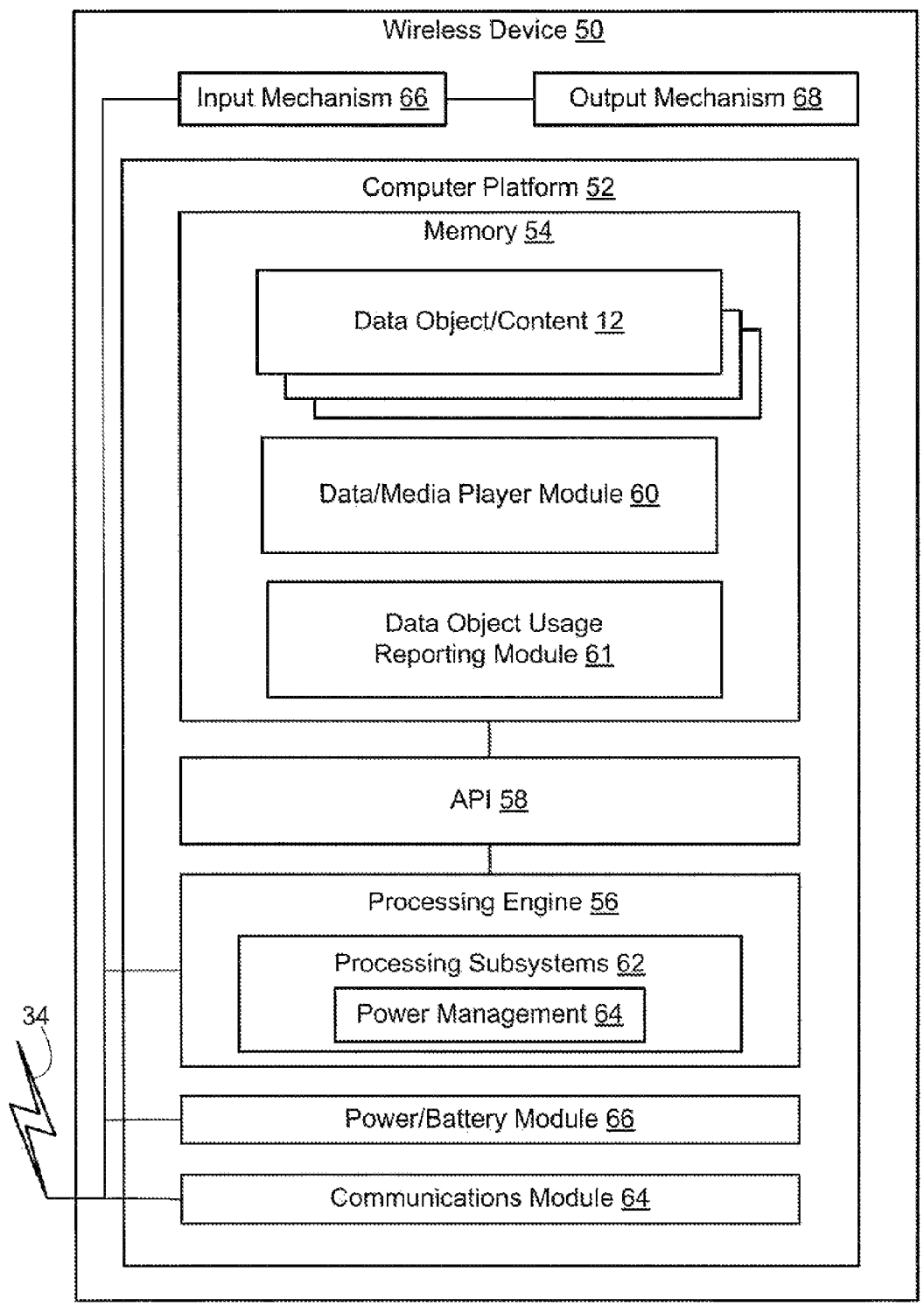
FIG. 3 is a block diagram of a wireless device for receiving broadcasted data objects that have been allocated network capacity based on data object popularity measurements, in accordance with another aspect.

Referring to FIG. 3, according to one aspect, a block diagram represents a wireless communication device operable to receive broadcast transmissions having one or more data objects assigned allocated delivery capacity based on popularity measurements. The wireless device 50 may include any type of computerized, wireless device, such as cellular telephone 16, Personal Digital Assistant (PDA) 18, two-way text pager, portable computer 20, and even a separate computer platform that has a wireless communications portal, and which also may have a wired connection to a network or the Internet. The apparatus and method for receiving broadcast transmissions can accordingly be performed on any form of wireless device of wireless computer module, including a wireless communication portal, including without limitation, wireless modems, PCMCIA cards, wireless access terminals, or any combination or sub-combination thereof.

The wireless device 50 includes computer platform 52 that can receive data transmitted across wireless network 34, receive and execute routines and applications and optionally display data transmitted from wireless network device 40 connected to wireless network 34. Computer platform 52 includes a memory memory54, which may comprise volatile and nonvolatile memory such as read-only and/or random-access memory (RAM and ROM), EPROM, EEPROM, flash cards, or any memory common to computer platforms. Further, memory 54 may include one or more flash memory cells, or may be any secondary or tertiary storage device, such as magnetic media, optical media, tape, or soft or hard disk.

Further, computer platform 52 also includes a processing engine 56, which may be an application-specific integrated circuit (ASIC), or other chipset, processor, logic circuit, or other data processing device. Processing engine 56 or other processor such as ASIC may execute an application programming interface (API) layer 58 that interfaces with any resident programs, such as broadcast/multicast player module 60, stored in the memory 54 of the wireless device 50. API 58 is typically a runtime environment executing on the respective wireless device. One such runtime environment is Binary Runtime Environment for Wireless® (BREW®) software developed by Qualcomm, Inc., of San Diego, Calif. Other runtime environments may be utilized that, for example, operate to control the execution of applications on wireless computing devices.

Processing engine 56 includes various processing subsystems 62 embodied in hardware, firmware, software, and combinations thereof, that enable the functionality of wireless device 50 and the operability of the wireless device on wireless network 34. For example, in one aspect, the processing engine 56 may include a power management subsystem 64 operable for managing the power consumption of power battery module 66. In some aspects optimal capacity allocation may result in minimization of the data object access delay, which corresponds to less power consumption at the wireless device. Access delay is defined as the amount of time a user has to wait to receive a requested data object. In other aspects, the processing engine 56 may include one or a combination of processing subsystems 62, such as: sound, non-volatile memory, file system, transmit, receive, searcher, physical layer, link layer, call processing layer, main control, remote procedure, music, audio, handset, diagnostic, digital signal processor, vocoder, messaging, call manager, Bluetooth®, Bluetooth® LPOS, position determination, position engine, user interface, sleep, data services, security, authentication, USIM/SIM, voice services, graphics, USB, video services, camera/camcorder interface and associated display drivers, multimedia such as MPEG, GPRS, etc., along with other functionality applications. It should be noted that the subsystems could include any data or data service operable on a wireless device, which embody the device's operational functionality.

Computer platform 52 may further include a communications module 64 embodied in hardware, firmware, software, and combinations thereof, that enables communications among the various components of the wireless device 50, as well as between the wireless device 50 and the wireless network 34. For example, the communications module is operable to receive one or more data objects 12 from data delivery system 10 or network device 40. The communication module may include the requisite hardware firmware, software and/or combinations thereof for establishing a wireless communication connection, including wireless signal transmit, receive, modulation and demodulation components.

The memory 54 may store one or more data objects 12 received from network delivery system 10 or network device 40 and which have been allocated a predetermined optimal delivery capacity based on popularity measurements. In alternate aspects, the wireless device may execute, e.g., "play," data objects 12 without storing the data object on the wireless device. The memory 54 may also store a data/media player, module 60 operable for playing the data objects that have been received from network delivery system 10 or network device 40.

The memory 54 may additionally store a data content usage reporting module 61 operable for providing data object usage information that is communicated to a network entity associated with data delivery system 10. In turn, the network entity uses the data object usage information to compile popularity measurements for one or more data objects. The data content usage reporting module 61 may be configured to provide data object usage information to the network entity on a predetermined schedule or the network entity may poll the wireless device to communicate the data object usage information on an as-needed basis. The data object usage information may include, but is hot limited to, the number of times a data object is downloaded and/or accessed, the time(s) day that a data object is downloaded and/or accessed or the like.

Additionally, wireless device 50 has input mechanism 66 for generating inputs into communication device, and output mechanism 68 for generating information for consumption by the user of the communication device. For example, input mechanism 66 may include a mechanism such as a key or keyboard, a mouse, a touch-screen display, a microphone, etc. In certain aspects, the input mechanisms 66 provides for user input, to activate an application on the communication device. Further, for example, output mechanism 68 may include a display, an audio speaker, a haptic feedback mechanism, etc. For example, one or more output mechanisms may be operable to present data objects 12 to a user of the device.

Figure 4:
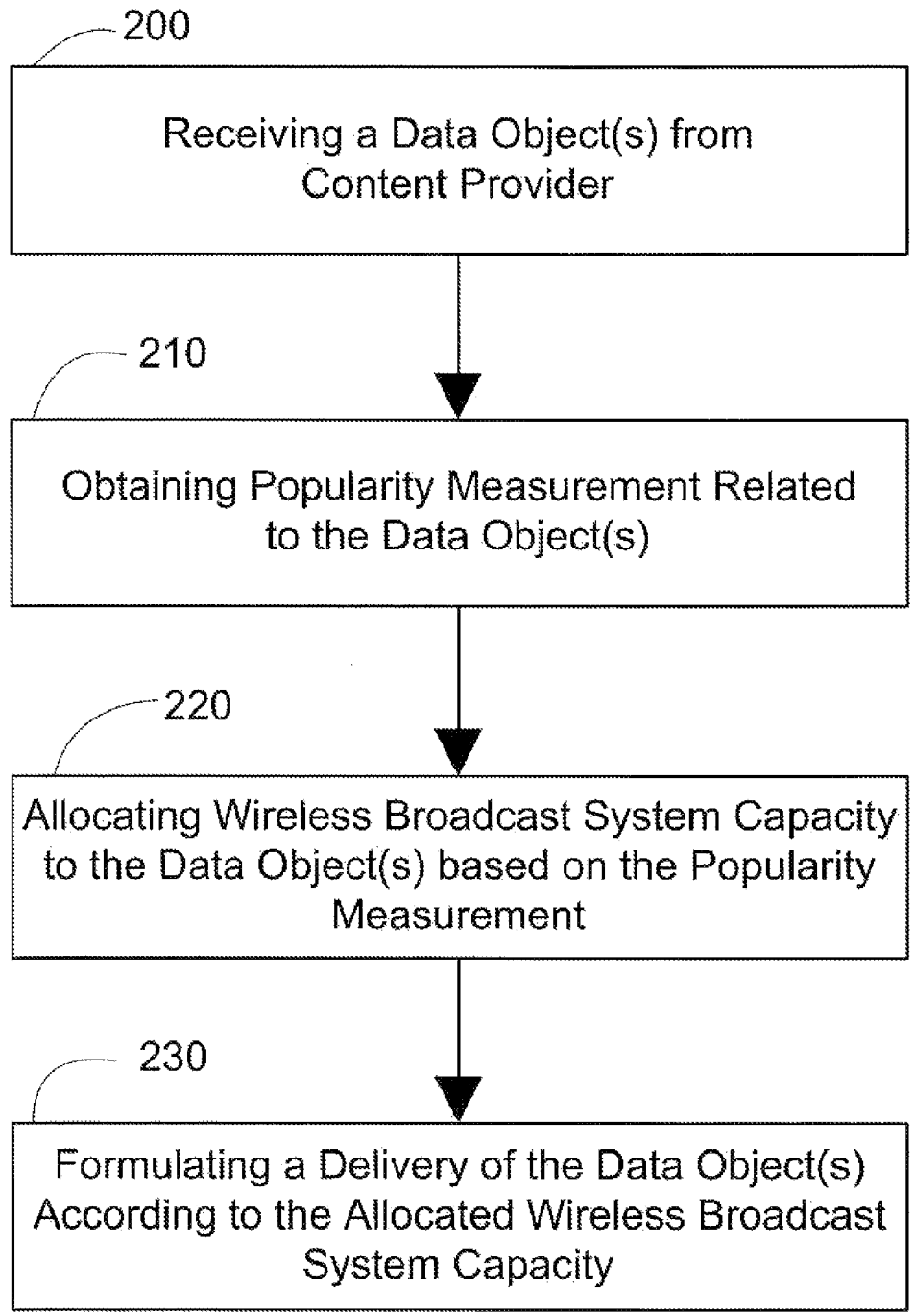
FIG. 4 is a flow diagram of a method for allocating broadcast network capacity based on data object popularity measurements, in accordance with an aspect.

FIG. 4 is a flow chart diagram depicting a method for allocating broadcast network capacity based on popularity measurements. At Event 200, a data object or multiple data objects are received from a content provider. The data object maybe any media object, such as a video, audio or multimedia content or any other data capable of being distributed and consumed on a wireless communication device. The data objects may be received at a central distribution point/operation center for subsequent wireless broadcast to wireless devices.

At Event 210, popularity measurements are obtained related to the received data object(s) or a group of data objects. Popularity measurements may be derived from information provided by subscription services, content providers or data object users. Additionally, popularity measurements may be calculated or otherwise derived, within the data delivery system (e.g., at central distribution point/operation center) or popularity measurements may be derived or otherwise calculated prior to being communicated, to the data delivery system, such-as at a subscription service or at a content provider. Popularity measurements may be updated on a predetermined scheduled or they may be continuously updated to provide for instantaneous accuracy of popularity information. In addition, the popularity measurement may define the user's preference for a given data object or group of data objects or the popularity measurement may define the importance for a given data object or group of data objects.

At Event 220, wireless broadcast system, capacity is allocated to the data object or group of data objects based on the popularity measurement associated with the data object or group of data objects. In some aspects, allocating broadcast system capacity may further include, (1) determining a delivery capacity for a transmission; (2) determining a predetermined identity and number of data objects to include in the transmission; and (3) allocating the given delivery capacity among the predetermined objects based on popularity measurements.

In one aspect, theoretical equations are applied to calculate a capacity value for the data object or group of data objects based on the popularity measurement. The capacity value is in relation to the available or residual capacity currently available In the broadcast network. Allocation of optimal capacity may be a result of optimizing mean reception failures, mean access failures or any other broadcast, objective. In alternate aspects, in ad hoe heuristic simulation may be applied to derive a capacity value.

At Event 230, the data object or group of data objects are formulated for delivery/broadcasted according to tire optimal capacity allocation based on the popularity measurement. As previously noted, optimal capacity allocation may result in minimization/optimization of the mean number of reception failures, the mean access delay time and/or battery power consumption at the wireless device.

Figure 5:
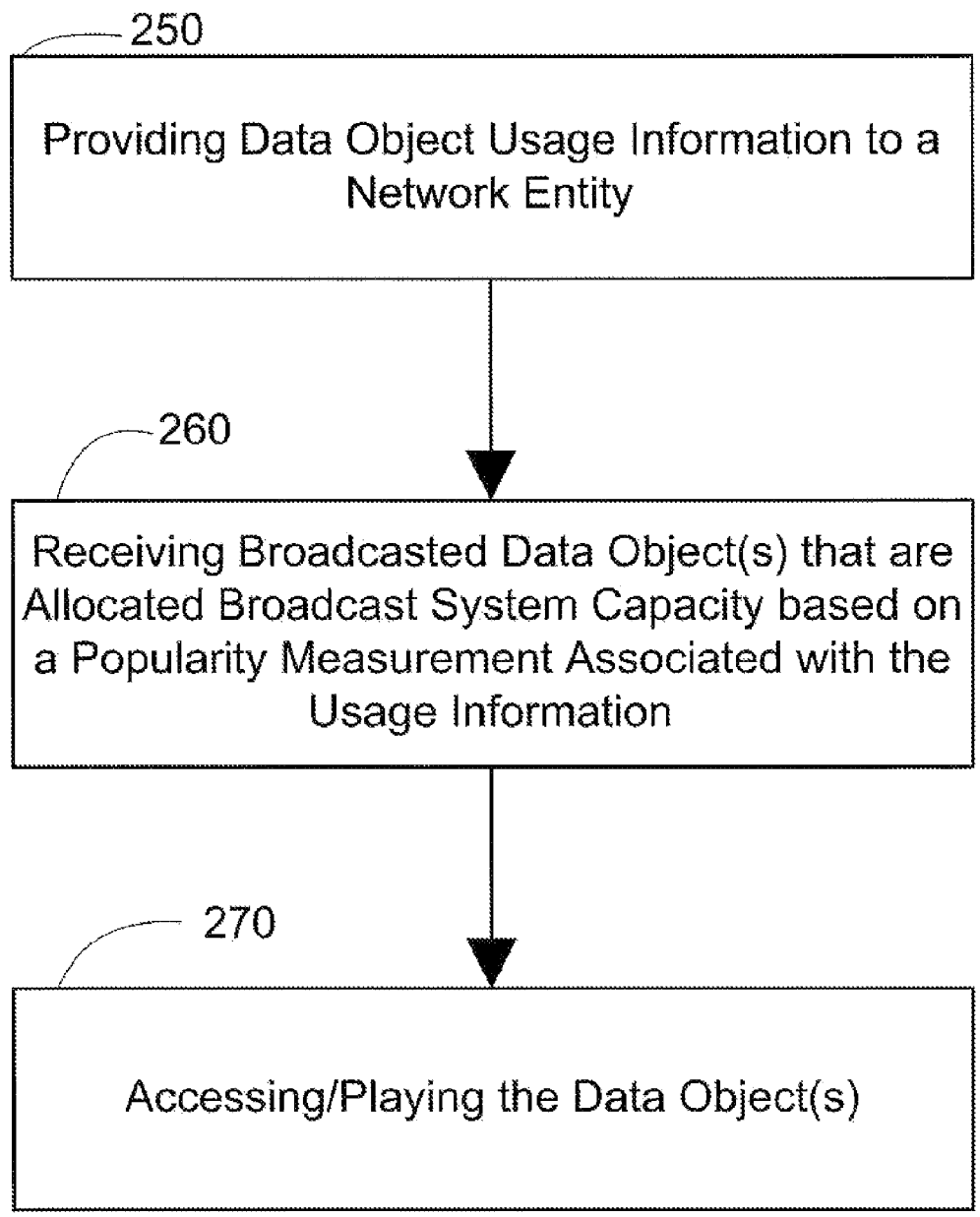
FIG. 5 is a flow diagram of a method for providing data object usage information and receiving broadcasted data objects allocated network capacity based on popularity measurements associated with the data object usage information, in accordance with an aspect.

FIG. 5 is a flow diagram depicting a method for reporting data object usage information and receiving broadcasted data objects, according to one aspect. At Event 250, a wireless device provides data object usage information to a network entity. The data object usage information may be provided by wireless communication of the information to the network entity. In such aspects, the wireless device may communicate the data object usage information on a predetermined schedule or, alternatively, the network entity may poll the wireless device to provide data object usage information on an as-needed basis. The network entity is associated with a data content delivery system and may operable or is in communication with an entity that is operable to use the data content usage-information to compile, calculate or-otherwise form popularity measurements for the one or more data objects. The data object usage information may include, but is not limited to, number of times that a data object, is downloaded and/or accessed/played, the times of day that a data object is downloaded and/or accessed/played and the like.

At Event 260, the wireless device receives one or more broadcasted data objects that have been allocated wireless broadcast system capacity based on a popularity measurement that has formed based, at least in part, on the data object usage Information provided by the wireless device. In one aspect, receiving the one or more broadcasted data objects includes receiving one or more broadcasted objects that have a delivery rate associated with the popularity measurement. In another aspect, receiving the one or more broadcasted data objects includes receiving one or more broadcasted objects that a redundant data quantity associated with the popularity measurement. The received broadcasted data objects may be real time broadcasted or non-real time broadcasted data objects.

At Event 270, a wireless device user accesses or otherwise plays one of the one or more received data objects to consume the data object at the wireless device. Accessing the data object will constitute an event that may be recorded in a data content usage log, which subsequently may form the data content usage information that is conveyed to the network entity.

The method described in relation to FIG. 5 may result in a decrease in the number of perceived reception failures occurring at the wireless device, and/or a decrease in the access delay in receiving/downloading the data object(s) and/or a decrease in power consumption.

The following provides one hypothetical example of using theoretical equations to determine a capacity allocation value for a data object or group of data objects based on a popularity measurement/metric associated with the data object(s). The equations demonstrated herein are by way of example only and should not be viewed as limiting. Other theoretical equations may also be used to determine capacity allocation based on popularity measurements without departing from the aspects herein disclosed. As noted previously, determining, capacity allocation based on popularity measurements is not limited to use of theoretical equations. The determination of capacity allocation based on popularity measurements may also be performed by any other known method, such as ad hoc heuristic simulation or the like.

In the hypothetical example herein described, a broadcast system delivers data objects with differing frequencies in accordance with a predetermined transmission schedule such that the mean number of fails in the broadcast system is minimized. A predetermined transmission schedule may be defined as the number of data objects delivered in a predetermined time or bandwidth. The mean number of fails may be defined as the total number of instances in which a given object is not received by a device that is supposed to receive the transmitted object. In such a system, according to the described aspects, the schedule can emphasize the most popular objects and de-emphasize the less popular objects. In addition to providing an improved perception of service by minimizing the number of instances an object is not reliably received at a wireless device, this scheme provides a model for allocating system capacity (e.g. throughput and/or bandwidth and/or channel capacity) for an object or set of objects as a function of the object(s) popularity/utility measure.

For a data object defined as (i)

$L_i$=length of object (i) in number of erasure control blocks;
$C_i$=channel capacity allocated to object (i) in bits/time unit;
ECB_size=erasure control block size in physical layer packets; and
PLP_size=physical layer packet size.

Thus, object (z) is transmitted every ($L_i$×ECB_size×PLP_size)/$C_i$ units of time within a delivery time window. Given a fixed delivery time window of size T, the number of iterations/repetitions corresponding to object (i) can be defined as:

$$m_i = \frac{T}{(L_i \times \text{ECB\_size} \times \text{PLP\_size})/C_i}, \quad \text{Equation (1)}$$
$$= \frac{T'}{L_i/C_i}.$$

where PLP_size is the physical layer packet size in bits and:

$$T'=T/(\text{ECB\_size} \times \text{PLP\_size}).$$

For the purposes of this hypothetical example-assume that the transmissions of the erasure control block are independent and, as such, erasures introduced by the communication channel are not correlated, across erasure control blocks. Thus, given the number of iterations $m_i$ for object (i) of length $L_i$, the probability that object (i) is not successfully received at a wireless device is given as:

$$(P_{fail})_i = [1-(1-q)^{L_i}]^{m_i}, \quad \text{Equation (2)}$$
$$= (1-d^{L_i})^{m_i}.$$

where q is the probability of decode failure within the erasure control block and:

$$d=1-q.$$

Additionally, for the purpose of this hypothetical, the broadcast system includes N number of data objects whose transmission windows overlap in time, R is the total number of broadcast system users and $p_i$ is the object access probability, e.g. an estimate of the fraction of users receiving object (i). Given the object access probability $p_i$, the capacity allocation module can determine the optimal fraction of bandwidth that should be allocated to each object.

The mean number of fails in the broadcast system is given as:

$$F = \sum_{i=1}^{N}(p_{fail})_i \times p_i \times R, \quad \text{Equation (3)}$$
$$= R\sum_{j=1}^{N}(1-d^{L_i})^{m_i} \times p_i$$
$$= R\sum_{i=1}^{N}(1-d^{L_i})^{\frac{T'C_i}{L_i}} \times p_i,$$

where,
F=mean number of failures;
$p_{fail}$=probability that the particular object is not received at the destination device; and
T'=time window.

Hence, for an optimization problem having the objective of minimizing the mean number of failures, channel capacity $C_i$ to be allocated to object (i) can be determined by solving the following optimization problem:

$$\sum_{i=1}^{N}(1-d^{L_i})^{\frac{T'C_i}{L_i}} \times p_i, \text{ given,} \quad \text{Equation (4)}$$

$$\sum_{i=1}^{N}C_i \leq C_R. \quad \text{Equation (5)}$$

where,

C=residual channel capacity dedicated for broadcast transmissions. Residual channel capacity is defined as the available capacity after considering the capacity consumption attributed to real-time streaming traffic.

The optimization problem may be solved using a predetermined estimator equation. In the illustrated example the optimization problem is solved using the Lagrange multiplier method. In which the Lagrange multiplier method is below:

$$\zeta = \sum_{i=1}^{N}p_i(1-d^{L_i})^{\frac{T'C_i}{L_i}} + \gamma\left(\sum_{i=1}^{N}C_i - C_R\right). \quad \text{Equation (6)}$$

where,
γ=the Lagrange multiplier.

Thus, the optimization problem is reduced to the following:

$$\frac{\partial \zeta}{\partial C_i} = p_i(1-d^{L_i})^{\frac{T'C_i}{L_i}}\ln(1-d^{L_i})\frac{T'}{L_i} + \gamma = 0, \quad \text{Equation (7)}$$
$$1 \leq i \leq N.$$
and $$\frac{\partial \zeta}{\partial \gamma} = \sum_{i=1}^{N}C_i - C_R = 0. \quad \text{Equation (8)}$$

The optimal capacity assignment should satisfy equations (7) and (8). Thus, solving the equation for the channel capacity to be allocated to object (i), $C_i$, results in:

$$C_i = \frac{L_i \cdot C_R}{A \cdot \ln(1-d^{L_i}) \cdot T'} + \frac{L_i \cdot B}{A \cdot \ln(1-d^{L_i}) \cdot T'} - \quad \text{Equation (9)}$$
$$\frac{\ln(-p_i \cdot \ln(1-d^{L_i}) \cdot (T'/L_i)) \cdot L_i}{\ln(1-d^{L_i}) \cdot T'}, 1 \leq i \leq N.$$

where, $$A = \sum_{j=1}^{N}\left(\frac{L_j}{\ln(1-d^{L_j}) \cdot T'}\right) \text{ and} \quad \text{Equation (10) and (11)}$$

-continued $$B = \sum_{j=1}^{N} \left( \frac{\ln(-p_j \cdot \ln(1-d^{L_j}) \cdot}{\ln(1-d^{L_j}) \cdot T'} \right).$$

Thus, in the illustrated hypothetical example of capacity allocation higher capacity is reserved for data objects with higher user probability. If all of the data objects have equal length and equal access probabilities, then equation (9) reduces to:

$$C_i = \frac{C_R}{N}. \qquad \text{Equation (12)}$$

and $$m_i = \frac{T'}{L/C_i} = \frac{T' \cdot C_R}{L \cdot N}. \qquad \text{Equation (13)}$$

where L is the fixed object length.

Figure 6:
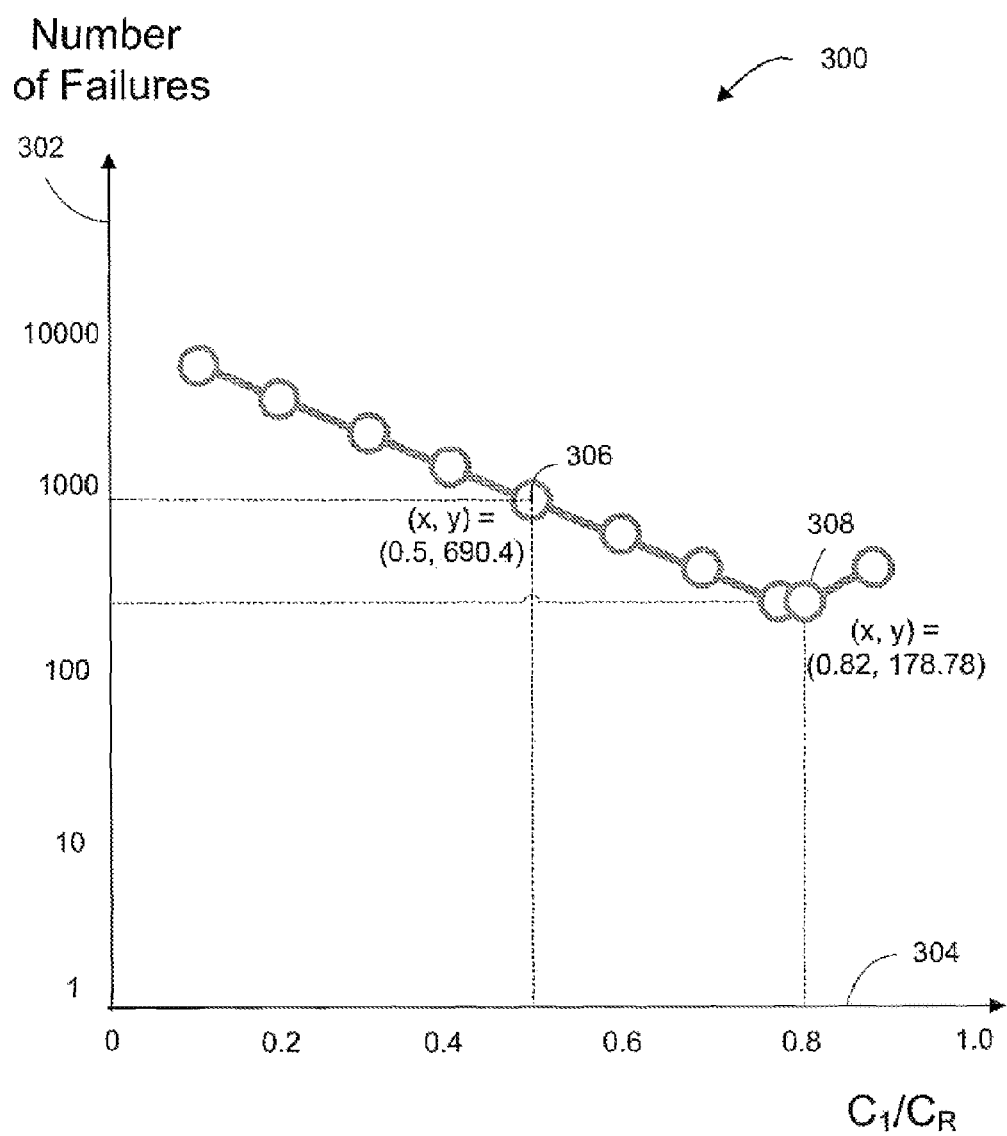
FIG. 6 is a x-y graph depicting broadcast system reception failures as a function of allocated capacity, in accordance with an aspect.

FIG. 6 is an x-y graph 300 that depicts the variation in the number of reception failures 302 in the broadcast system as a function of residual allocated capacity 304. The system includes two objects with allocated capacity $C_1$ and $C_2$, respectively, where $C_2=C_R-C_1$, and where $C_R$ is the residual channel capacity dedicated for the broadcast transmission. The access probabilities are 0.8 for $C_1$ and 0.2 for $C_2$ and object lengths are in the ratio of $L_1/L_2=7/3$. The labeled point 306, corresponding to (x, y)=(0.5, 690.4), represents the number of failures, 690.4, that occur if equal capacity allocation is provided to the data objects, e.g. if $C_1=0.5$ and $C_2=0.5$. The labeled point 308, corresponding to (x, y)=(0.82, 178.78), represents the number of failures, 178.78, that occur if optimal capacity allocation is provided to the data objects, e.g. $C_1=0.82$ and $C_2=0.18$. The optimal capacity allocation is provided by applying Equation (9) noted above. Thus, optimal allocation of capacity reduces the number of reception failures by about 512, e.g. from about 690 for equal capacity allocation to about 178 for capacity allocation based on popularity measurement.

Figure 7:
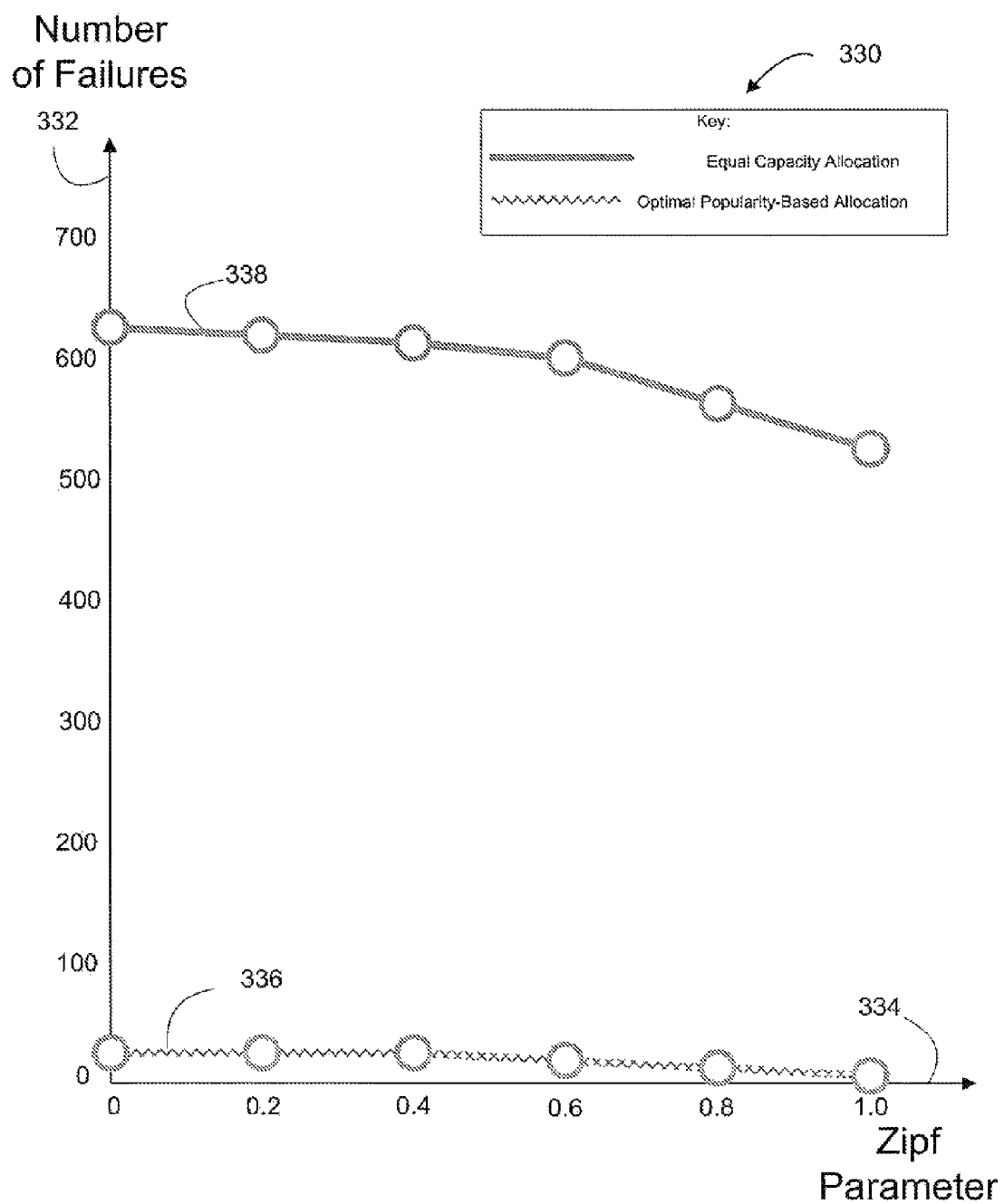
FIG. 7 is an x-y graph depicting broadcast system reception failures as a function of an object popularity distribution parameter for equal and optimal capacity allocation, in accordance with another aspect.

FIG. 7 is an x-y graph 330 that depicts the variation in the number of reception failures 332 in the broadcast system as a function of the data object popularity distribution parameter 334. The graph illustrates a comparison between optimal capacity allocation curve 336 based on popularity measure and equal capacity allocation curve 338, with varying Zipf distribution parameters. In this aspect, data object popularity is assumed to follow a Zipf distribution pattern. It should be noted, however, that other distribution models may be utilized. The Zipf distribution follows Zipf's law, which is the observation that frequency of occurrence of some event (P), as a function of the rank (i), when the rank is determined by the above frequency of occurrence, is a power-law function $P_i \sim 1/i^{\alpha}$ with the exponent a close to unity (1). In the illustrated example of FIG. 7, the broadcast system includes 100 data objects with object length uniformly distributed between about 0.7 and about 10 media minutes. As shown, with a Zipf parameter between 0 and 1, the number of failures ranges from about 630 to about 550 for equal capacity allocation while, in contrast, the number of failures ranges from about 30 to about 10 for optimal capacity allocation based on popularity measure.

Thus, optimal channel allocation according to the described aspects results in a reduction of the number of reception failures in the broadcast system versus assigning equal capacity allocation to all data objects in the system. The optimal capacity allocation based on popularity measure therefore provides a mechanism for improving perception of the quality of service (QoS) by scaling object-specific QoS to the object popularity measurement.

In addition to minimizing the number of reception failures experienced by a broadcast system, popularity measurements may be used to minimize the mean access delay. Access delay is defined as the amount of time a user has to wait to receive a data object, such as a video file, an audio file or the like. By minimizing access delay, the time in which the wireless device is awake and listening to receive a broadcast, and thus consuming power, is lessened, thus, battery life is preserved. The following theoretical equations illustrate the concept of using popularity measurements to minimize access delay.

Assume for the purposes of this example that consecutive occurrences of a data object (i) are equally spaced and let $s_i$ define the spacing for object (i). Additionally, assume uniform distribution of wireless device wake-up or request over time, thus, the mean access time for object (i) is $s_i/2$. The popularity measure for object (i) is defined as $w_i$ and the overall number of objects is defined as N. Thus the overall mean access time t is defined as:

$$t = \frac{1}{2}\sum_{i=1}^{N} w_i s_i \qquad \text{Equation (14)}$$

If all the objects are of identical length then, using the result from optimization equation (6), minimum overall mean access delay is achieved when the spacing of each segment is inversely proportional to the square-root of the popularity of the data object.

$$s_i \propto \frac{1}{\sqrt{w_i}}. \qquad \text{Equation (15)}$$

If the data objects are of varying length, l, then generalization of Equation (15) results in the following condition on the spacing of the data objects.

$$s_i \propto \sqrt{\frac{l_i}{w_i}}. \qquad \text{Equation (16)}$$

As follows, assume a segment length of $l_i$, and define $e(l_i)$ as the probability that the data object is received with unrecoverable losses. Thus, the expected number of consecutive instances with unrecoverable losses is defined as $e(l_i)/(1-e(l_i))$. Thus, mean object access delay may be expressed as:

$$t_i = \frac{s_i}{2} + s_i \frac{e(l_i)}{1-e(l_i)}, \qquad \text{Equation (17)}$$

$$= \frac{1}{2} s_i \frac{1+e(l_i)}{1-e(l_i)}.$$

If C is the total capacity and $C_i$ is the capacity assigned to object (i) then, $s_i = l_i/C_i$. Thus, the optimization problem can be stated as:

Minimize $$t = \frac{1}{2}\sum_{i=1}^{N}(w_i l_i / C_i)((1 + e(l_i))/(1 - e(l_i)))$$ Equation (18)

given, $$\sum_{i=1}^{N} C_i \leq C$$

Solving the optimization problem, the overall mean access delay can be minimized when:

$$s_i \propto \sqrt{\frac{l_i}{w_i}\frac{1 - e(l_i)}{1 + e(l_i)}}.$$ Equation (19)

Thus, according to this example, as defined by Equation (19), mean access delay is minimized when the spacing between consecutive instances of a data object is directly proportional to the square root of the length of the object and inversely proportional to the square root of the popularity measurement of the object.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium, may be integral to the processor. Further, in some aspects, the processor and the storage medium may reside in an ASIC. Additionally, the ASIC may reside in a user terminal. In the alternative, the processor and the storage medium may reside as discrete components, in a user terminal. Additionally, in some aspects, the steps and/or actions of a method or algorithm may reside as one or any combination or set of instructions on a machine readable medium and/or computer readable medium While the foregoing disclosure shows illustrative aspects and/or embodiments, it should be noted that various changes and modifications could be made herein without departing from the scope of the described aspects and/or embodiments as defined by the appended claims. Furthermore, although elements of the described embodiments may be described or claimed In the singular, the plural is contemplated unless limitation to the singular is explicitly stated. Additionally, ail or a portion of any aspect and/or embodiment may be utilized with all or a portion of any other aspect and/or embodiment, unless stated otherwise.

Thus, the described aspects provide for systems, methods, device and apparatus that provide for the allocation of broadcast delivery capacity based on popularity measurements associated with broadcasted data objects. By allocating broadcast delivery capacity based on popularity measurements Quality of Service (QoS) perception can be improved by decreasing the mean number of reception failures, decreasing the data object access delay and/or decreasing the consumption of wireless device resources, such as battery power and processing capabilities.

Many modifications and other embodiments of the invention will, come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they axe used in a generic and descriptive sense only and not for purposes of limitation.

What is claimed is:

1. A method for formulating a delivery of data content in a wireless broadcast system, the method comprising:
   receiving a popularity measurement associated with at least one data object;
   determining a failure probability that the at least one data object is not successfully received at a wireless device;
   calculating a channel capacity to be allocated to the at least one data object by solving an optimization problem using an estimator equation based on the received popularity measurement and the determined failure probability; and
   allocating a wireless broadcast system capacity for delivery of the at least one data object based on the calculated channel capacity.

2. The method of claim 1, wherein determining a failure probability further comprises calculating a mean number of failures in the wireless broadcast system for the at least one data object.

3. The method of claim 1, wherein solving the optimization problem further comprises taking into account a residual capacity of the wireless broadcast system, wherein the residual capacity is an available capacity after considering a capacity consumption of real-time streaming traffic.

4. The method of claim 3, wherein solving the optimization problem related to a wireless broadcast system resource allocation objective further defines the wireless broadcast system resource allocation objective as chosen from a group consisting of minimization of reception failures, minimization of access delays, and minimization of receiving device power consumption.

5. The method of claim 1, wherein receiving the popularity measurement associated with at least one data object further defines the at least one data object as chosen from a group consisting of a non-real time data object and a real time data object.

6. The method of claim 1, wherein receiving the popularity measurement further comprises receiving usage statistics from a data content service.

7. The method of claim 1, wherein receiving the popularity measurement further comprises receiving usage data from data object users.

8. At least one processor configured with processor-executable instructions to perform operations comprising:
- receiving a popularity measurement associated with at least one data object;
- determining a failure probability that the at least one data object is not successfully received at a wireless device;
- calculating a channel capacity to be allocated to the at least one data object by solving an optimization problem using an estimator equation based on the received popularity measurement and the determined failure probability; and
- allocating a wireless broadcast system capacity for delivery of the at least one data object based on the calculated channel capacity.

9. The processor of claim 8, wherein determining a failure probability further comprises calculating a mean number of failures in a broadcast system for the at least one data object.

10. The processor of claim 8, wherein solving the optimization problem further comprises taking into account a wireless broadcast system residual capacity, wherein the wireless broadcast system residual capacity is an available capacity after considering a capacity consumption of real-time streaming traffic.

11. A computer program product comprising a non-transitory computer-readable medium having instructions stored thereon which, when performed by a computer, perform a method for formulating a delivery of data content, the method comprising:
- receiving a popularity measurement associated with at least one data object;
- determining a failure probability that the at least one data object is not successfully received at a wireless device;
- calculating a channel capacity to be allocated to the at least one data object by solving an optimization problem using an estimator equation based on the received popularity measurement and the determined failure probability; and
- allocating a wireless broadcast system capacity for delivery of the at least one data object based on the calculated channel capacity.

12. The computer program product of claim 11, further comprises causing the computer to adjust a delivery rate for the at least one data object.

13. The computer program product of claim 11, further comprises causing the computer to adjust a redundant data quantity in the at least one data object.

14. The computer program product of claim 11, wherein solving the optimization problem related to the wireless broadcast system resource allocation objective further defines the wireless broadcast system resource allocation objective as chosen from a group consisting of minimization of reception failures, minimization of access delays, and minimization of receiving device power consumption.

15. The computer program product of claim 11, wherein receiving the popularity measurement further comprises causing the computer to define the at least one data object as chosen from a group consisting of a non-real time data object and a real time data object.

16. The computer program product of claim 11, wherein receiving the popularity measurement further comprises causing the computer to receive usage statistics from a data content service.

17. The computer program product of claim 11, wherein receiving the popularity measurement further comprises causing the computer to receive usage data from data object users.

18. The computer program product of claim 11, wherein determining a failure probability further comprises calculating a mean number of failures in a broadcast system for the at least one data object.

19. The computer program product of claim 11, wherein solving the optimization problem further comprises taking into account a wireless broadcast system residual capacity, wherein the wireless broadcast system residual capacity is an available capacity after considering a capacity consumption of real-time streaming traffic.

20. A wireless network device, comprising:
- a computer platform including a processor and a memory; and
- a capacity allocation module stored in the memory and executable by the processor, wherein the capacity allocation module includes capacity allocation logic operable for receiving a popularity measurement associated with at least one data object, determining a failure probability that the at least one data object is not successfully received at a wireless device, calculating a channel capacity to be allocated to the at least one data object by solving an optimization problem using an estimator equation based on the received popularity measurement and the determined failure probability, and determining allocation of a wireless network broadcast capacity for delivery of the at least one data object based on the calculated channel capacity.

21. The wireless network device of claim 20, further comprising a delivery mechanism operable for delivering the at least one data object according to the allocated wireless network broadcast capacity.

22. The wireless network device of claim 21, wherein the capacity allocation logic is further operable for adjusting a delivery rate for the at least one data object according to the calculated channel capacity.

23. The wireless network device of claim 20, wherein the capacity allocation logic is further operable for adjusting a redundant data quantity in the at least one data object according to the allocated wireless network broadcast capacity.

24. The wireless network device of claim 20, wherein the optimization problem is related to a wireless broadcast system resource allocation objective.

25. The wireless network device of claim 24, wherein the optimization problem related to the wireless broadcast system resource allocation objective further defines the wireless broadcast system resource allocation objective as chosen from a group consisting of minimization of data object reception failures, minimization of access delays, and minimization of receiving device power consumption.

26. The wireless network device of claim 20, wherein the capacity allocation logic is further operable for solving the optimization problem using a Lagrange multiplier method.

27. The wireless network device of claim 20, wherein determining a failure probability further comprises calculating a mean number of failures in a broadcast system for the at least one data object.

28. The wireless network device of claim 20, wherein solving the optimization problem further comprises taking into account a wireless broadcast system residual capacity, wherein the wireless broadcast system residual capacity is an available capacity after considering a capacity consumption of real-time streaming traffic.

29. A network device, comprising:
  means for receiving a popularity measurement associated with at least one data object;
  means for determining a failure probability that the at least one data object is not successfully received at a wireless device;
  means for calculating a channel capacity to be allocated to the at least one data object by solving an optimization problem using an estimator equation based on the received popularity measurement and the determined failure probability; and
  means for allocating a wireless broadcast system capacity for delivery of the at least one data object based on the calculated channel capacity.

30. The network device of claim 29, wherein solving the optimization problem related to a wireless broadcast system resource allocation objective further defines the wireless broadcast system resource allocation objective as chosen from a group consisting of minimization of reception failures, minimization of access delays, and minimization of receiving device power consumption.

31. The network device of claim 29, wherein solving the optimization problem using the estimator equation further comprises solving the optimization problem using a Lagrange multiplier method.

32. The network device of claim 29, wherein the means for receiving the popularity measurement associated with at least one data object further defines the at least one data object as chosen from a group consisting of a non-real time data object and a real time data object.

33. The network device of claim 29, wherein the means for receiving the popularity measurement further comprises means for receiving usage statistics from a data content service.

34. The network device of claim 29, wherein the means receiving the popularity measurement further comprises means for receiving usage data from data object users.

35. A method for receiving data content at a wireless device, comprising:
  providing data object usage information to a network entity; and
  receiving one or more broadcasted data objects that are allocated according to a wireless broadcast system capacity based on a calculated channel capacity associated with the data object usage information, wherein the calculated channel capacity is calculated by solving an optimization problem using an estimator equation based on a popularity measurement derived from the data object usage information provided to the network entity and a failure probability that at least one of the one or more broadcast data objects is not successfully received by the wireless device.

36. The method of claim 35, wherein receiving the one or more broadcasted data objects further comprises receiving broadcasted data objects that have a delivery rate associated with the calculated channel capacity.

37. The method of claim 35, wherein receiving the one or more broadcasted data objects further comprises receiving broadcasted data objects that have a redundant data quantity associated with the calculated channel capacity.

38. The method of claim 35, wherein receiving the one or more broadcasted data objects further comprises receiving one or more real time broadcasted data objects.

39. The method of claim 35, wherein receiving the one or more broadcasted data objects further comprises receiving one or more non-real time broadcasted data objects.

40. The method of claim 35, wherein providing the data object usage information to the network entity further comprises responding to data object usage polling requests.

41. The method of claim 35, wherein providing the data object usage information to the network entity further comprises providing data object usage data to a network service based on a schedule.

42. The method of claim 35, wherein solving the optimization problem further comprises taking into account a mean number of failures in a broadcast system for the data object, wherein the mean number of failures is calculated based on the failure probability.

43. The method of claim 35, wherein solving the optimization problem further comprises taking into account a wireless broadcast system residual capacity, wherein the wireless broadcast system residual capacity is an available capacity after considering a capacity consumption of real-time streaming traffic.

44. At least one processor configured to perform a method for formulating delivery of data object, the method comprising:
  providing data object usage information to a network entity; and
  receiving one or more broadcasted data objects that are allocated according to a wireless broadcast system capacity based on a calculated channel capacity associated with the data object usage information, wherein the calculated channel capacity is calculated by solving an optimization problem using an estimator equation based on a popularity measurement derived from the data object usage information provided to the network entity and a failure probability that at least one of the one or more broadcast data objects is not successfully received by a wireless device.

45. A computer program product comprising a non-transitory computer-readable medium having instructions stored thereon which, when performed by a computer, perform a method for formulating a delivery of data content, the method comprising:
  providing data object usage information to a network entity; and
  receiving one or more broadcasted data objects that are allocated according to a wireless broadcast system capacity based on a calculated channel capacity associated with the data object usage information, wherein the calculated channel capacity is calculated by solving an optimization problem using an estimator equation based on a popularity measurement derived from the data object usage information provided to the network entity and a failure probability that at least one of the one or more broadcast data objects is not successfully received by a wireless device.

46. The computer program product of claim 45, wherein calculating the channel capacity further comprises causing the computer to receive broadcasted data objects that have a delivery rate associated with the calculated channel capacity.

47. The computer program product of claim 45, wherein calculating the channel capacity further comprises causing the computer to receive broadcasted data objects that have a redundant data quantity associated with the calculated channel capacity.

48. The computer program product of claim 45, wherein calculating the channel capacity further comprises causing the computer to receive one or more real time broadcasted data objects.

49. The computer program product of claim 45, wherein calculating the channel capacity further comprises causing the computer to receive one or more non-real time broadcasted data objects.

50. The computer program product of claim 45, wherein receiving the popularity measurement further comprises causing the computer to respond to data object usage polling requests.

51. The computer program product of claim 45, wherein receiving the popularity measurement further comprises causing the computer to provide data object popularity data to a network service based on a schedule.

52. A wireless communication device, comprising:
a computer platform including a processor and a memory;
a data object usage reporting module stored in the memory and executable by the processor, wherein the data object usage reporting module is operable for providing data object usage information to a network entity;
a communications module stored in the memory and executable by the processor, wherein the communications module is operable for receiving one or more broadcasted data objects that are allocated according to a wireless broadcast system capacity based on a calculated channel capacity associated with the data object usage information, wherein the calculated channel capacity is calculated by solving an optimization problem using an estimator equation based on a popularity measurement derived from the data object usage information provided to the network entity and a failure probability that at least one of the one or more broadcast data objects is not successfully received by a wireless device
a data/media player module stored in the memory and executable by the processor, wherein the data/media player module is operable for playing the one or more broadcasted data objects.

53. The wireless device of claim 52, wherein the communications module is further operable for receiving broadcasted data objects that have a delivery rate associated with the calculated channel capacity.

54. The wireless device of claim 52, wherein the communications module is further operable for receiving broadcasted data objects that have a redundant data quantity associated with the calculated channel capacity.

55. The wireless device of claim 52, wherein the communications module is further operable for receiving one or more non-real time broadcasted data objects that are allocated according to the wireless broadcast system capacity based on the calculated channel capacity.

56. The wireless device of claim 52, wherein the data object usage reporting module is further operable for responding to data object usage polling requests.

57. The wireless device of claim 52, wherein the data object usage reporting module is further operable for providing data object usage data to a network service based on a schedule.

58. A wireless communication device, comprising:
means for providing data object usage information to a network entity; and
means for receiving one or more broadcasted data objects that are allocated according to a wireless broadcast system capacity based on a calculated channel capacity associated with the data object usage information, wherein the calculated channel capacity is calculated by solving an optimization problem using an estimator equation based on a popularity measurement derived from the data object usage information provided to the network entity and a failure probability that at least one of the one or more broadcast data objects is not successfully received by a wireless device.

59. The wireless communication device of claim 58, wherein the means for receiving the one or more broadcasted data objects further comprises means for receiving broadcasted data objects that have a delivery rate associated with the calculated channel capacity.

60. The wireless communication device of claim 58, wherein the means for receiving the one or more broadcasted data objects further comprises means for receiving broadcasted data objects that have a redundant data quantity associated with the calculated channel capacity.

61. The wireless communication device of claim 58, wherein a number of reception failures decreases as a result of receiving the one or more broadcasted data objects that are allocated according to the wireless broadcast system capacity based on the calculated channel capacity.

62. The wireless communication device of claim 58, wherein a data object access delay decreases as a result of receiving the one or more broadcasted data objects that are allocated according to the wireless broadcast system capacity based on the popularity measurement associated with the calculated channel capacity.

63. The wireless communication device of claim 58, wherein power consumption or the wireless device decreases as a result of receiving the one or more broadcasted data objects that are allocated according to the wireless broadcast system capacity based on the popularity measurement associated with the calculated channel capacity.

64. The wireless communication device of claim 58, wherein the means for receiving the one or more broadcasted data objects further comprises means for receiving one or more real time broadcasted data objects.

65. The wireless communication device of claim 58, wherein the means for receiving the one or more broadcasted data objects further comprises means for receiving one or more non-real time broadcasted data objects.

66. The wireless communication device of claim 58, wherein the means for providing the data object usage information to the network entity further comprises means for responding to data object usage polling requests.

67. The wireless communication device of claim 58, wherein the means for providing the data object usage information to the network entity further comprises means for providing data object usage data to a network service based on a schedule.

68. The wireless communication device of claim 58, wherein solving the optimization problem further comprises taking into account a mean number of failures in a broadcast system for the data object, wherein the mean number of failures is calculated based on the failure probability.

69. The wireless communication device of claim 58, wherein solving the optimization problem further comprises taking into account a wireless broadcast system residual capacity, wherein the wireless broadcast system residual capacity is an available capacity after considering a capacity consumption of real-time streaming traffic.

70. A method for formulating a delivery of data content in a wireless broadcast system, the method comprising:
allocating a wireless broadcast system capacity for delivery of at least one data object based on a channel capacity, the channel capacity calculated from a popularity measurement associated with the data object and a failure probability that the data object would not be successfully received at a wireless device.

71. The method of claim 70, wherein the failure probability is calculated from a mean number of failures in the wireless broadcast system for the at least one data object.

72. The method of claim 70, further comprising solving an optimization problem related to a wireless broadcast system resource allocation objective that takes into account a residual capacity of the wireless broadcast system, wherein the residual capacity is an available capacity after considering a capacity consumption of real-time streaming traffic.

73. The method of claim 72, wherein solving the optimization problem defines the wireless broadcast system resource allocation objective as chosen from a group consisting of minimization of reception failures, minimization of access delays, and minimization of receiving device power consumption.

74. The method of claim 70, wherein the popularity measurement associated with the data object defines the data object as chosen from a group consisting of a non-real time data object and a real time data object.

75. The method of claim 70, further comprising receiving usage statistics from a data content service.

76. The method of claim 70, further comprising receiving usage data from data object users.

* * * * *